United States Patent

Beutel

[11] Patent Number: 4,638,220
[45] Date of Patent: Jan. 20, 1987

[54] HIGH VOLTAGE TRANSFORMER
[75] Inventor: Robert C. Beutel, Portsmouth, Va.
[73] Assignee: General Electric Company, Portsmouth, Va.
[21] Appl. No.: 708,146
[22] Filed: Mar. 4, 1985
[51] Int. Cl.[4] .................................. H01J 29/70
[52] U.S. Cl. ................................ 315/411; 363/126
[58] Field of Search ............... 315/411; 363/68, 126

[56] References Cited

U.S. PATENT DOCUMENTS

| | | | |
|---|---|---|---|
| 3,843,903 | 10/1974 | Miyoshi et al. | 315/29 |
| 3,866,086 | 2/1975 | Miyoshi et al. | 315/411 |
| 3,904,928 | 9/1975 | Sawada et al. | 315/410 |
| 3,936,719 | 2/1976 | Miyoshi et al. | 321/2 |
| 3,947,749 | 3/1976 | Kimura et al. | 321/47 |
| 4,091,349 | 5/1978 | Niederjohn et al. | 336/192 |
| 4,112,337 | 9/1978 | Nagasaki et al. | 315/411 |
| 4,144,480 | 3/1979 | Nagasaki et al. | 315/411 |
| 4,229,787 | 10/1980 | Thibodeau | 363/126 |
| 4,266,269 | 5/1981 | Toba | 363/68 |
| 4,293,903 | 10/1981 | Mochida et al. | 363/68 |
| 4,315,306 | 2/1982 | Tol et al. | 363/126 |

*Primary Examiner*—Theodore M. Blum

[57] ABSTRACT

A flyback transformer is disclosed having a primary winding coupled to a horizontal deflection circuit for receiving input pulses and a secondary circuit for developing a high voltage and a lower voltage for supplying a cathode ray tube anode electrode and focus electrode, respectively. The transformer secondary circuit includes three windings and three diodes, the diodes and windings being arranged to relatively equally distribute voltage stresses therebetween.

6 Claims, 2 Drawing Figures

HIGH VOLTAGE TRANSFORMER

BACKGOUND OF THE INVENTION

1. Field of the Invention

The present invention relates in general to transformers and in particular to a flyback transformer of the type used to provide cathode ray tube operating voltages.

2. Description of the Prior Art

Television receivers commonly employ a flyback transformer to develop the high voltages necessary to energize a cathode ray tube (CRT) display. Such a transformer typically has its primary winding coupled to a horizontal deflection circuit for receiving input voltage pulses, in order to develop in its secondary circuit at least two output voltages: a high voltage for supplying the CRT anode electrode and a lower voltage for supplying the CRT focus electrode. These output voltages are typically in the range of about 25 kV–30 kV for the anode voltage and 24–31 percent of the anode voltage for the focus voltage.

Prior art patents show the use of various diode and winding arrangements in the flyback transformer secondary circuits to produce the requisite output voltages. As described, for example, in U.S. Pat. No. 3,936,719, the interconnection of the diodes and windings in the secondary circuit affects both the amplitude and the regulation of the output voltages.

Due to the nature of the pulsed input voltage, the diodes in the secondary circuit are at certain times reverse biased and hence nonconducting. At these times the diodes are forced to withstand very high reverse bias voltages, commonly referred to as stresses. The magnitudes of these stresses determine to a large extent the length of the operational life of the diodes. In the prior art, the secondary circuits are typically designed with insubstantial regard for minimizing and/or equally distributing the stresses amongst the diodes and windings, considerations which would extend the diode lives. These flyback transformers have the disadvantage of exhibiting relatively early failure of the overstressed diodes, usually resulting in complete destruction of the flyback transformer.

OBJECTS OF THE INVENTION

The principal object of the present invention is to provide a new and improved high voltage transformer which is not subject to the aforementioned problems and disadvantages.

Another object of the present invention is to provide a high voltage transformer in which the stresses across the diodes in the secondary circuit are relatively equally distributed.

A further object of the present invention is to provide a high voltage transformer which is simple in construction, inexpensive to manufacture, and reliable in operation over a long, useful life.

SUMMARY OF THE INVENTION

The foregoing and other objects of the invention are achieved through the use of a new and improved high voltage transformer for supplying voltages to external loads, such as the anode and focus electrodes of a CRT. In accordance with the present invention, the diodes in the transformer secondary circuit are arranged to relatively equally share the reverse bias voltage stresses.

In the preferred embodiment of the invention illustrated and described herein, the transformer includes a primary winding for receiving power from a source, such as the horizontal deflection circuit of a television receiver, and a secondary circuit. The secondary circuit comprises three windings arranged with three diodes so as to relatively equally distribute the reverse bias voltage stresses amongst the diodes. The resultant transformer develops a high and a lower voltage for supplying the anode and focus electrodes of the CRT, respectively, but is not prone to the diode failure common to the prior art transformers.

BRIEF DESCRIPTION OF THE DRAWINGS

These and other objects, features and advantages of the invention will become apparent from the following detailed description when read in conjunction with the accompanying drawings.

DETAILED DESCRIPTION

Figure 1:
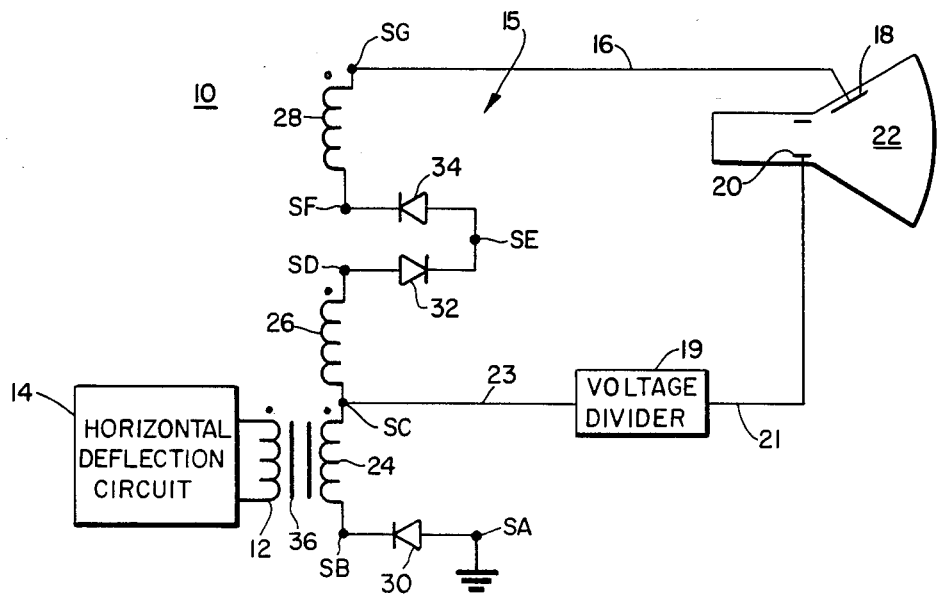
FIG. 1 is a schematic circuit diagram of a flyback transformer implemented in accordance with the present invention.

Referring now to the drawings, FIG. 1 shows a high voltage flyback transformer 10 having a primary winding 12 for receiving input pulses supplied by a horizontal deflection circuit 14 of the type found in a typical television receiver. The transformer further includes a secondary circuit 15 comprising first, second and third windings, indicated respectively at 24, 26 and 28, and first, second and third diodes, indicated respectively at 30, 32 and 34. The secondary circuit is coupled to primary winding 12 at first winding 24 through an appropriate magnetic medium 36, for example an iron core.

Describing in detail the interconnection of the secondary circuit components, first diode 30 is connected in series between ground and a first end of winding 24, and poled with its anode to ground. The opposite end of winding 24 is connected to a first end of winding 26. Second and third diodes 32 and 34 are connected in series between the opposite end of winding 26 and a first end of winding 28, and are poled in the same direction as first diode 30. The opposite end of winding 28 is applied to an anode electrode 18 of a CRT 22 via a connection 16. The connection of winding 24 with the first end of winding 26, indicated at point SC, is applied to a voltage divider circuit 19 via a connection 23, and the output of the voltage divider circuit is applied to a CRT focus electrode 20 via a connection 21.

The operation of transformer 10 will be described with reference to the voltage levels and waveforms indicated at A–G of FIG. 2, each representing a voltage present at the corresponding circuit points indicated respectively at SA–SG of FIG. 1. The waveforms are ideal representations of signals experimentally measured during a single horizontal output pulse developed by horizontal deflection circuit 14. For purposes of clarity and explanation, forward voltage drops across the diodes are not illustrated.

As seen from FIG. 1, diode 30 prevents the voltage at point SB from falling lower than one diode voltage drop below the ground potential A at point SA. Thus, a horizontal output pulse applied to winding 12 produces, with respect to point SC at the common connection of windings 24 and 26, a negative-going pulse B in first winding 24, and a complementary positive-going pulse D in second winding 26; pulse B being clamped at its minimum at one diode drop below the reference ground by diode 30. Consequently, a relatively smooth direct current (DC) voltage level C is developed at point SC. Diodes 32 and 34 prevent the voltage at point SF from falling more than two diode voltage drops below the voltage at point SD. Thus, the same horizontal output pulse produces, with respect to point SG, a negative-going pulse F in winding 28 which is clamped at one diode drop down from the DC voltage level E developed at point SE. By virtue of the capacitive nature of CRT anode electrode 18, point SG is effectively at alternating current (AC) ground, causing the development of DC voltage level G. DC voltage level G is applied directly to the CRT anode, while DC voltage level C is appropriately reduced by voltage divider circuit 19 for application to the CRT focus electrode.

Figure 2:
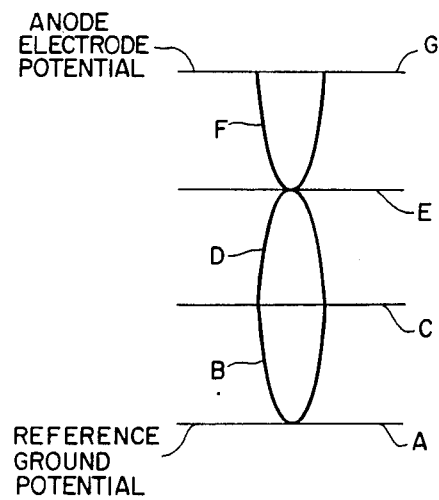
FIG. 2 is a waveform diagram illustrating voltage waveforms at selected points in the secondary circuit of the transformer of FIG. 1.

Examining now the reverse bias voltage stresses across the diodes, the greatest stress across diode 30 occurs when voltage pulse B is most positive which, in FIG. 2, is seen to correspond to the DC voltage level C. The greatest stress across diode 32 occurs when pulse D is most negative, which corresponds to the potential difference between DC voltage levels C and E. Similarly, the largest stress across diode 34 occurs when pulse F is most positive, a condition which corresponds to the potential difference between DC voltage levels E and G.

Typical values for the pulse waveforms shown in FIG. 2 place DC levels C, E and G at 10 kV, 20 kV and 30 kV, respectively. It will thus be appreciated that each diode and each winding in the secondary circuit are subjected to substantially identical stresses of about 10 kV. DC voltage level G is at the correct value to be applied directly to anode 18, as shown. DC voltage level C must be reduced to an appropriate CRT focus voltage value, typically about 5 kV, which in the preferred embodiment of the invention illustrated herein is accomplished by a conventional voltage divider circuit 19.

It will be appreciated that, while diodes are shown in the preferred embodiment of the invention, other rectifying means can be substituted therefor. Further, while in the preferred embodiment of the invention second and third diodes 32 and 34 are discrete devices, a single rectifying means capable of withstanding a reverse voltage stress in excess of the potential difference between the DC voltage levels C and G may be substituted therefor. The use of such a single rectifying means has particular application in flyback transformers where the rectifiers often comprise multiple wafers which can be assembled in various configurations to meet selected stress requirements.

While the present invention has been shown and described with reference to a preferred embodiment, it will be understood that numerous modifications, changes, variations, substitutions and equivalents will occur to those skilled in the art without departing from the spirit and scope of the invention. Accordingly, it is intended that the invention herein be limited only by the scope of the appended claims.

What is claimed is:

1. A high voltage transformer comprising:
   a primary winding; and
   a secondary circuit coupled to said primary winding for developing a high voltage in response to the energizing of said primary winding, said secondary circuit including first, second and third windings and first and second rectifying means;
   said first rectifying means being connected in a selected polarity between ground and a first end of said first winding;
   the opposite end of said first winding being connected to a first end of said second winding;
   said second rectifying means being connected in said selected polarity between the opposite end of said second winding and a first end of said third winding; and
   terminal means at the opposite end of said third winding at which said high voltage appears for supplying said high voltage to an external load.

2. A transformer in accordance with claim 1 wherein:
   said first rectifying means comprises a first diode;
   said second rectifying means comprises second and third diodes connected in series; and
   said external load includes a capacitive component.

3. A transformer in accordance with claim 2 and further including terminal means at said first end of said second winding at which a lower voltage appears for supplying a lower voltage to an external load.

4. In an apparatus including a cathode ray tube display wherein a horizontal deflection circuit supplies voltage pulses to a flyback transformer for developing a high voltage to supply to the anode of a cathode ray tube; said flyback transformer comprising, in combination:
   a primary winding coupled to said horizontal deflection circuit;
   a secondary circuit coupled to said primary winding for developing said high voltage, said secondary circuit comprising first, second and third windings and at least first and second diodes;
   said first diode being connected in a selected polarity between ground and a first end of said first winding;
   the opposite end of said first winding being connected to a first end of said second winding;
   said second diode being connected in said selected polarity between the opposite end of said second winding and a first end of said third winding; and
   terminal means at the opposite end of said third winding at which said high voltage appears for supplying said high voltage to said anode of said cathode ray tube.

5. The combination of claim 4 and further comprising a third diode connected in said selected polarity in series with said second diode between said opposite end of said second winding and said first end of said third winding.

6. The combination of claim 5 and further including terminal means at said first end of said second winding at which a lower voltage appears for supplying a lower voltage to a focus electrode of said cathode ray tube.

* * * * *